May 22, 1951 H. S. BLOCH 2,553,742
DEPOSIT RESISTANT MANIFOLD
Filed May 22, 1948
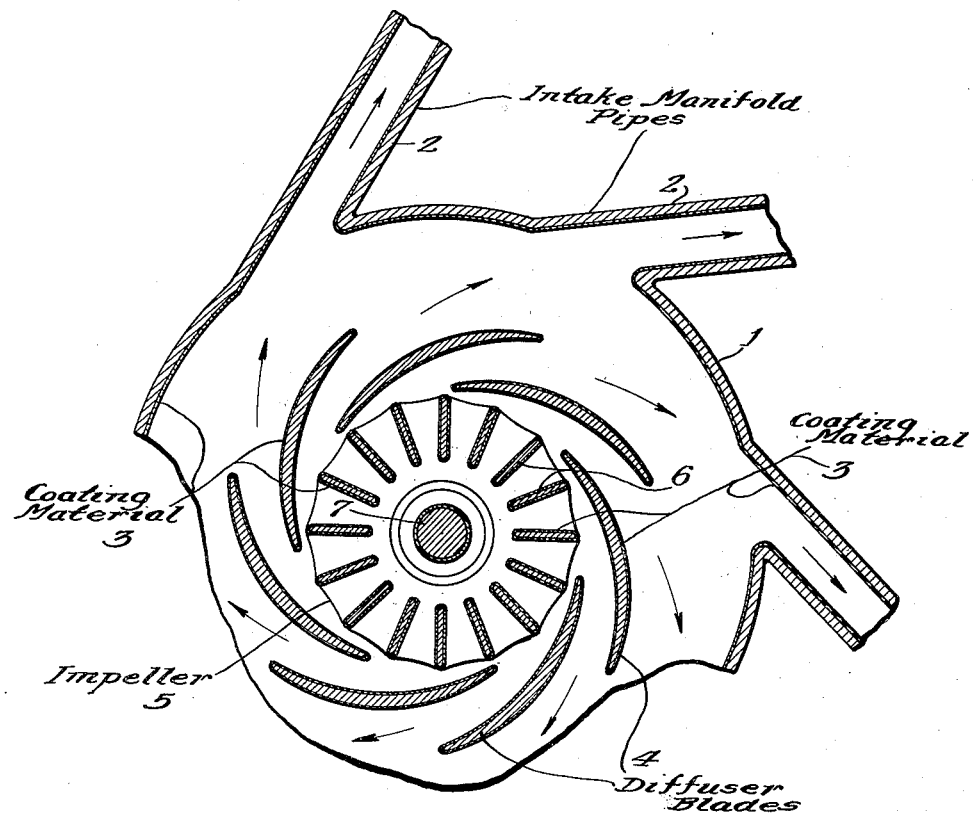
Inventor:-
Herman S. Bloch
By:- Maynard P. Venema
Atty
Philip J. Liggett
Agent Patented May 22, 1951

2,553,742

UNITED STATES PATENT OFFICE 2,553,742

DEPOSIT RESISTANT MANIFOLD

Herman S. Bloch, Chicago, Ill., assignor to Universal Oil Products Company, Chicago, Ill., a corporation of Delaware Application May 22, 1948, Serial No. 28,752

9 Claims. (Cl. 123—52)

This invention relates to an internally lined or coated intake manifold for an internal combustion engine, and more specifically, to means for preventing the deposition of oil-soluble matter and solid particles within the interior of a vapor distributing system or intake-manifold of an engine, such that the operating efficiency of the engine will in no way be impaired.

In gasoline burning and other types of internal combustion engines, there is generally deposited within the fuel distributing system and primarily within the intake manifold section, materials which are largely organic in nature and which are oil-soluble. For example, gasoline inhibitors, dyes, or other additives, as well as their oxidation products, and tetra-ethyl lead decomposition products comprise the principal source of the material which is deposited. It has been determined that the deposition of material within the fuel distributing or intake manifold section results in a loss of engine efficiency and power that is quite appreciable.

The effect of the deposited matter in a fuel distributing system is particularly noticeable and dangerous in connection with airplane engines. The deposit builds up within the super-charger and diffuser, as well as manifold tubing so that the allowable loading capacity in a given airplane must be reduced from that which it would normally be for the particular type of plane and power plant. The deposition of material within the fuel distributing section is also troublesome in that it necessitates an over-haul and cleaning-out operation at more frequent intervals than would normally be necessary. For example, certain engines which would ordinarily be subjected to inspection and over-haul after 1000 hours of service, are at the present time being subjected to inspection and over-haul after 600 to 700 hours of service because of the deposition occurring to the extent that engine operation is appreciably affected, particularly under acceleration and take-off operations.

The material which is deposited within the manifold system leaves a rough uneven surface which tends to lower the engine efficiency, particularly in an internal combustion engine of the type used for airplanes where fuel is injected at a high velocity and pressure. Apparently, as the internal surface becomes rough and uneven, the frictional resistance to flow exerts a certain amount of turbulence in the vapor stream flow which results in a lower engine efficiency.

It is the principal object of the present invention to provide a means for preventing the deposition of oil-soluble matter within the fuel distributing manifold section of an internal combustion engine.

It may also be stated that it is an object of the invention to provide an internally lined or coated fuel intake manifold for an engine that will substantially preclude the deposition of organic oil-soluble matter and non-volatile material which may be carried therethrough with the fuel stream.

Broadly, the invention provides a method for preventing the deposition of oil-soluble matter within a fuel distributing system which comprises coating the inner surface thereof with a lipophobic material.

In a more specific embodiment the invention provides an improved intake-manifold suitable to distribute fuel to the cylinders of an internal combustion engine, which comprises in combination, metallic distributing members having a lipophobic coating on the interior surfaces thereof which are exposed to the fuel stream passing therethrough.

As noted hereinabove, most of the materials which are deposited within the intake manifold of internal combustion engines are of an oil-soluble nature. Thus, by the use of a lipophobic coating (i. e., one that repels oil or fatty materials) there is provided a surface to which the oil-soluble materials will not adhere and they will be continuously blown or drawn into an engine to be passed therethrough. There are of course various types of coating materials which are lipophobic, or hydrophilic, and which may be used in combination with the intake manifold piping, or fuel distributing parts, and it is not intended to limit this invention to any one particular type of coating material. Lipophobic coating materials applicable to the present use are preferably organic or mixed organic-inorganic coating materials such as, for example, silicone resins; aminealdehyde resins, such as thiourea-formaldehyde, melamineformaldehyde, or urea-formaldehyde resins; polyvinyl acetate polyvinyl chloride coatings, polyvinyl alcohols or their acetals; highly polar polyesters and polyamides; cellulosic films of the ether type such as ethyl cellulose or the ester type such as the acetates, nitrates, or propionates; salts of polyacrylic acid or polymethacrylic acid, or the lower esters of these polyacids; polyallyl alcohol; polyethylene glycols and carboxymethyl cellulose derivatives such as the salts. Of these materials, those which are capable of withstanding relatively high temperatures, such as the silicone resins and the urea-formaldehyde resins are preferable. These materials may be applied from solution or in molten resin form, and are thereafter either air-dried or baked.

The temperature of the intake manifold and connecting fuel distributing parts is relatively cool as compared to the engine block and the exhaust manifold; however, manifold temperatures may at times approach the temperature range of from 400 to 500° F. The fuel distributing apparatus and intake manifold may be cooled by a special cooling system, but in general, air cooling is relied upon to maintain this portion of the engine at a relatively low temperature. For example, the manifold of an airplane engine in operation may have a temperature of the order of from 200–300° F., but immediately after running and with the plane not in motion, the temperature may approach the aforementioned range of from 400–500° F., by reason of the hot engine block conducting heat thereto, with little or no air cooling being available to lower the temperature.

The accompanying drawing shows diagrammatically in a sectional view, a portion of a super-charger and intake manifold pipes such as commonly used with aircraft engines. The blower case 1 has a plurality of intake manifold pipes 2 extending from its periphery, with one manifold pipe provided for each cylinder of the engine. The interior portion of the blower case 1 and of each of the intake manifold pipes 2 has a suitable lipophobic coating, indicated as the internal layer 3. Likewise, the internal portions of the super-charger, including the diffuser blades 4, impeller 5 and impeller blades 6, and shaft 7, all have the coating material 3 in order that the deposit be prevented within all portions of the fuel distributing system or manifold. The coating material 3 may be any one of the aforementioned lipophobic materials, and is coated on all internal portions of the manifold to an optimum thickness.

It is not intended to limit this invention to coating any one type of metal or to any one type of intake manifold. Manifold systems may be of aluminum or magnesium alloy, steel tubing, cast steel or the like. The supercharger and diffuser of an internal combustion engine, employing the pressure induction of fuel, may be of magnesium alloy, while the distributing piping or conduits connecting between the diffuser and the various cylinders may be of a steel tubing. The magnesium alloy, or aluminum parts may be oxide coated by a chromatizing or phosphatizing operation to provide a surface which is lipophobic, or a surface which is particularly suitable for the application of a lipophobic coating material.

Further, while the invention is particularly advantageous in connection with airplane engines, the difficulty is present with all types of internal combustion engines, and it is therefore not intended to limit the improvement to any particular internal combustion engine, fuel distributing system or intake manifold.

The following specific example serves to illustrate the advantage of the improved coated manifold.

A leaded aviation fuel of 100–130 grade which was inhibited with p-n-butylaminophenol and dyed green with a mixture of Butter Yellow and 1,4 di-o-toluidoanthraquinone, during a three-hour test on a full-scale aviation engine caused a deposit equivalent to 43.6 mg. per gallon of fuel in the steel intake manifold. The same fuel in the absence of the inhibitor but with the dye and tetra-ethyl lead caused a deposit of 9.0 mg. per gallon of fuel, and in the absence of all additives the hydrocarbon fuel alone deposited 1.0 mg. per gallon. After the intake manifold was coated with a baked urea-formaldehyde resin, the leaded, dyed, and inhibited fuel deposited only 2.3 mg. per gallon of fuel.

In a second instance, a similar steel intake manifold was coated with a silicone resin, and a leaded, dyed and inhibited fuel, such as described in the previous example, was used during a three-hour test period in an aviation engine. The deposit in this manifold was found to be 4.1 mg. per gallon of fuel.

I claim as my invention:

1. A method for minimizing the adherence of oil-soluble matter to a fuel distributing system which comprises coating the inner surfaces thereof with a lipophobic material.

2. A method for minimizing the adherence of oil-soluble matter to the fuel injection and manifold section of an internal combustion engine which comprises coating the inner surface of said section with a lipophobic material.

3. The method of claim 2 further characterized in that said lipophobic material is an organic coating.

4. The method of claim 2 further characterized in that said lipophobic material is a silicone resin.

5. The method of claim 2 further characterized in that said lipophobic material is a urea-formaldehyde resin.

6. A deposit-resistant fuel distributing manifold comprising a tubular conduit section having a lipophobic material applied to its inner surfaces.

7. A deposit-resistant hydrocarbon vapor distributing manifold comprising a metallic tubular section having a lipophobic coating on the inner surfaces thereof exposed to said hydrocarbon vapor.

8. The deposit resistant manifold of claim 6 further characterized in that said lipophobic coating is a silicone resin.

9. The deposit resistant manifold of claim 6 further characterized in that said lipophobic coating is a urea-formaldehyde resin.

HERMAN S. BLOCH.

REFERENCES CITED

The following references are of record in the file of this patent:

UNITED STATES PATENTS

| Number | Name | Date |
|---|---|---|
| 1,151,503 | Wilesmith | Aug. 24, 1915 |
| 1,282,266 | Merritt | Oct. 22, 1918 |
| 1,512,961 | Weil | Oct. 28, 1924 |